No. 882,836. PATENTED MAR. 24, 1908.
M. P. McLAUGHLIN.
FLEXIBLE CONDUIT JOINT.
APPLICATION FILED MAR. 13, 1907.
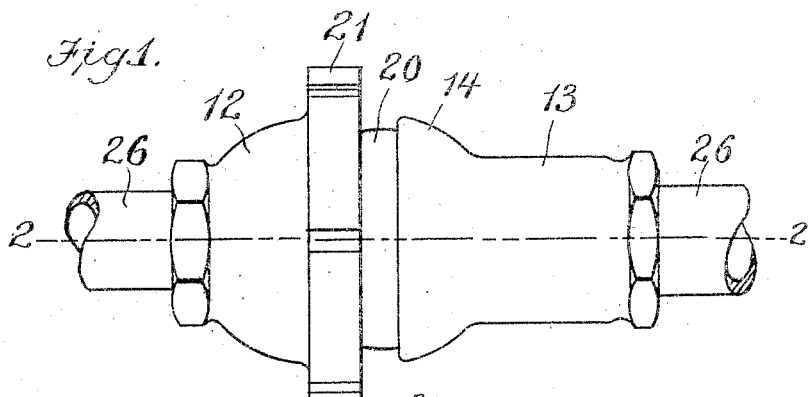
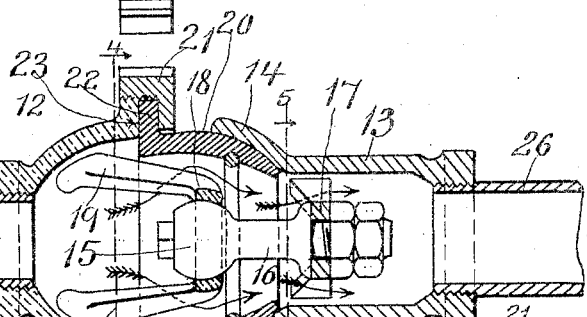
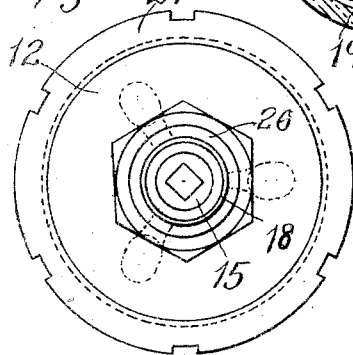 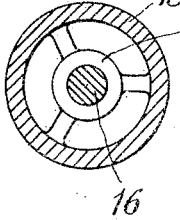 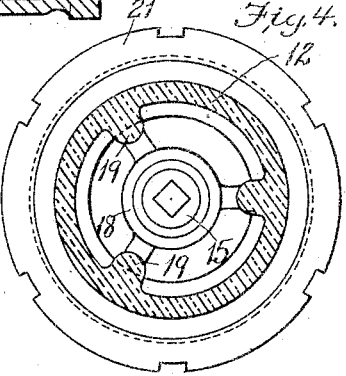
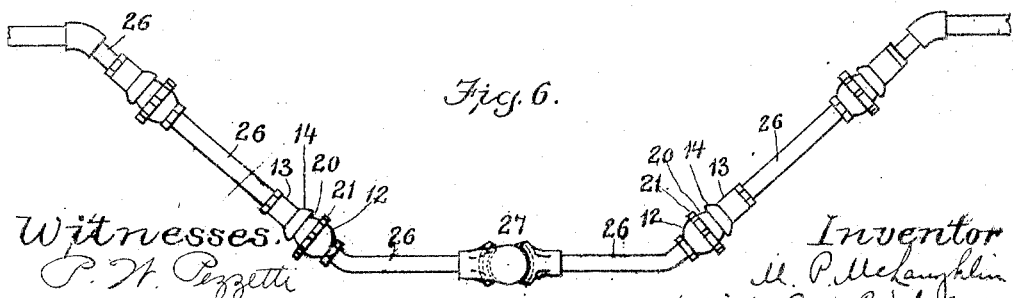
Witnesses.
P. W. Pezzetti
E. Batchelder
Inventor
M. P. McLaughlin
by Wright, Brown, Quinby & May
Atty's.

UNITED STATES PATENT OFFICE.

MILTON P. McLAUGHLIN, OF WAKEFIELD, MASSACHUSETTS.

FLEXIBLE CONDUIT-JOINT.

No. 882,836.  Specification of Letters Patent.  Patented March 24, 1908.

Application filed March 13, 1907. Serial No. 362,084.

*To all whom it may concern:*

Be it known that I, MILTON P. McLAUGHLIN, of Wakefield, in the county of Middlesex and State of Massachusetts, have invented certain new and useful Improvements in Flexible Conduit-Joints, of which the following is a specification.

This invention relates to flexible conduits composed mainly of sections of metal or other rigid material, flexibly connected so that each may have a certain degree of independent swinging movement without interrupting the continuity of the conduit.

An example of the class of conduits to which my invention relates, is found in means for conducting compressed air, steam or other fluid between railway cars or between a locomotive tender and a car.

My invention is embodied in a conduit joint of improved construction adapted to connect two adjacent conduit sections, and permit their independent movement, the joint forming a part of the conduit.

The invention consists in the improvements which I will now proceed to describe and claim.

Of the accompanying drawings, forming a part of this specification,—Figure 1 represents a side elevation of a conduit joint embodying my invention. Fig. 2 represents a section on line 2—2 of Fig. 1. Fig. 3 represents an end view of the joint. Fig. 4 represents a section on line 4—4 of Fig. 2. Fig. 5 represents a section on line 5—5 of Fig. 2. Fig. 6 represents a side view of a conduit composed of a plurality of sections and a plurality of joints connecting the same, the joints being constructed in accordance with my invention.

The same letters of reference indicate the same parts in all the figures.

My improved conduit joint comprises two terminal conduit sections 12 and 13, composed of any suitable rigid or inexpansible material. The section 13 has one of its end portions formed as a socket 14, which is internally convex, its inner surface being a segment or zone of a hollow sphere. The sections are provided with inter-engaged coupling members located within the conduit, and holding the sections against rectilinear longitudinal movement away from each other. The coupling members, as here shown, comprise, first, a ball member 15 formed on a stud 16 which is secured to a web or spider 17 in the conduit 13, and secondly an annular socket member 18 which surrounds the ball member, and is connected with the section 12 by arms 19.

The periphery of the ball member 15 is a sphere or a segment of a sphere, the center of which is the center of the segmental inner surface of the conduit section 13. The coupling members are so arranged that they hold the sections 12 and 13 separated from each other by an intervening space which permits either of the sections to swing in all directions about the center of the coupling member 15. The section 12 is provided with an annular extension 20, which bridges the space between the sections 12 and 13, and has a convex external surface which is a segment of a sphere, and is formed to fit and slide upon the concave inner surface of the socket 14, the center of the coupling member 15 being also the center of the convex surface of the extension 20. The said extension is made of expansible material, so that it is adapted to be pressed outwardly against the socket 14 to maintain a fluid-tight joint therewith by pressure within the conduit.

Any suitable material may be employed for the extension 20, such as rubber vulcanized to semi-hardness without having the relative rigidity of so-called hard rubber.

If desired, the extension may be made of lead or an expansible alloy or composition.

The extension 20 is detachably secured to the section 12, the preferred securing means being a flanged coupling nut 21 engaging an outwardly-projecting flange 22 formed on the extension 20, said flange resting on a seat 23 formed on the section 12, the latter having a screw-threaded portion surrounding the seat 23, and engaging the internal thread of the nut 21.

24 represents a spring which bears on the inner surface of the extension 12, and exerts an outward pressure on the same tending to set the extension outwardly against the socket 14, said spring being preferably a resilient ring cut at one point, and having a tendency to expand.

As clearly indicated in Fig. 2 of the drawings, around the expansible portion 20, there is an open space between the edge of the concave socket portion 14 and the coupling 21 which connects said expansible portion to the terminal section 12. The said expansible portion is therefore free to be acted upon by the spring 24 without restriction of its pressure by anything surrounding the expansible portion other than the internal surface of the socket 14.

It will be seen that the expansible extension 20 is adapted to be at all times set out against the socket 13 by internal pressure, thus maintaining a tight joint. The coupling members connecting the sections 12 and 13 within the conduit perform the office of connecting the sections of the joint and holding them against separation. Owing to the location of the coupling members within the conduit and to the relatively small area of the rubbing surfaces of said members, the friction caused by independent swinging movements of the sections is much less than would be the case if the coupling members were outside the conduit.

The sections 12 and 13 are adapted for connection with suitable pipe sections 26, preferably by means of internal screw threads, their outer ends engaging external threads on the pipe sections, as shown in Fig. 2.

In Fig. 6 I show an elongated conduit which includes a plurality of joints embodying my invention, this conduit being of the character used between cars or between a locomotive tender and a car, and provided at 27 with the usual separable coupling, the latter forming no part of my invention.

I claim:

1. A flexible conduit joint comprising two terminal sections, one having an internally concave socket portion, and the other an externally convex expansible inner portion fitting said socket, the joint being formed with an open space around the expansible portion between the edge of the concave socket portion and the coupling which connects the expansible portion to its terminal section, complemental coupling members attached to the sections, and located within the conduit, the said inner portion being provided internally with an expanding spring.

2. A flexible conduit joint comprising two terminal inexpansible sections separated by an intervening space, a ball coupling member attached to one section, a socket coupling member attached to the other section, said members projecting from the respective sections, and being interengaged between the same and within the conduit, one section having an internally concave socket, an expansible, externally convex extension carried by the other section, and bridging said space, the said extension fitting the said socket, and means for detachably securing the extension to the section by which it is carried.

3. A flexible conduit joint comprising two terminal inexpansible sections separated by an intervening space, a ball coupling member attached to one section, a socket coupling member attached to the other section, said members projecting from the respective sections, and being interengaged between the same and within the conduit, one section having an internally concave socket, while the other has an annular seat and a screw-threaded portion outside the seat, an expansible, externally convex extension fitting said socket, and having a flange bearing on said seat, and a flanged coupling nut engaging the flange of the extension and the said screw-threaded portion.

In testimony whereof I have affixed my signature, in presence of two witnesses.

MILTON P. McLAUGHLIN.

Witnesses:
  C. F. BROWN,
  E. BATCHELDER.